(12) United States Patent
Silverbrook

(10) Patent No.: US 7,465,027 B2
(45) Date of Patent: Dec. 16, 2008

(54) NOZZLE ARRANGEMENT FOR A PRINTHEAD INTEGRATED CIRCUIT INCORPORATING A LEVER MECHANISM

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 11/954,988

(22) Filed: Dec. 12, 2007

(65) Prior Publication Data

US 2008/0088675 A1   Apr. 17, 2008

Related U.S. Application Data

(63) Continuation of application No. 11/764,746, filed on Jun. 18, 2007, now Pat. No. 7,322,679, which is a continuation of application No. 11/442,191, filed on May 30, 2006, now Pat. No. 7,252,367, which is a continuation of application No. 11/165,183, filed on Jun. 24, 2005, now Pat. No. 7,055,934, which is a continuation of application No. 11/038,201, filed on Jan. 21, 2005, now Pat. No. 6,976,751, which is a continuation of application No. 10/713,093, filed on Nov. 17, 2003, now Pat. No. 7,008,046, which is a continuation of application No. 10/302,275, filed on Nov. 23, 2002, now Pat. No. 6,669,332, which is a continuation of application No. 10/120,347, filed on Apr. 12, 2002, now Pat. No. 6,540,332, which is a continuation-in-part of application No. 09/112,767, filed on Jul. 10, 1998, now Pat. No. 6,416,167.

(30) Foreign Application Priority Data

Jul. 15, 1997   (AU)   .................................... PO7991
Mar. 25, 1998   (AU)   .................................... PP2592

(51) Int. Cl.
*B41J 2/04* (2006.01)

(52) U.S. Cl. .............................. 347/54; 347/63; 347/56
(58) Field of Classification Search .................. 347/12, 347/13, 20, 40, 42, 44, 47, 54, 56, 61–64, 347/67; 60/527–529
See application file for complete search history.

(56) References Cited

U.S. PATENT DOCUMENTS 4,423,401 A   12/1983   Mueller (Continued)

FOREIGN PATENT DOCUMENTS

DE   1648322 A   3/1971

(Continued)

OTHER PUBLICATIONS

Ataka, Manabu et al., "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-7157.

*Primary Examiner*—Juanita D Stephens

(57) ABSTRACT

The invention relates to a nozzle arrangement for a printhead integrated circuit, the arrangement having walls defining a chamber and a roof with an ink ejection port defined in a substrate that incorporates drive circuitry. The arrangement further includes a motion transmitting structure formed on the substrate and having an effort formation, a lever arm formation and a load formation. The lever arm formation is interposed between the effort formation and the load formation. A resiliently deformable sealing structure is interposed between the lever arm formation and the substrate to permit pivotal movement of the lever arm formation with respect to the substrate. A thermal bend actuator is connected to the drive circuitry and is reciprocally displaceable with respect to the substrate on receipt of a signal from said drive circuitry. The actuator is connected to the effort formation so that reciprocal movement of the actuator towards and away from the substrate is converted into reciprocal angular displacement of the ejecting member via the motion-transmitting structure, to eject ink in the chamber from the ink ejection port.

7 Claims, 4 Drawing Sheets

U.S. PATENT DOCUMENTS

| | | | |
|---|---|---|---|
| 4,553,393 A | 11/1985 | Ruoff | |
| 4,672,398 A | 6/1987 | Kuwabara et al. | |
| 4,737,802 A | 4/1988 | Mielke | |
| 4,864,824 A | 9/1989 | Gabriel et al. | |
| 4,894,664 A * | 1/1990 | Tsung Pan | 347/63 |
| 4,962,391 A | 10/1990 | Kitahara et al. | |
| 5,029,805 A | 7/1991 | Albarda et al. | |
| 5,126,755 A | 6/1992 | Sharpe et al. | |
| 5,258,774 A | 11/1993 | Rogers | |
| 5,666,141 A | 9/1997 | Matoba et al. | |
| 5,719,604 A | 2/1998 | Inui et al. | |
| 5,812,159 A | 9/1998 | Anagnostopoulos et al. | |
| 6,019,457 A | 2/2000 | Silverbrook | |
| 6,264,850 B1 | 7/2001 | Silverbrook | |
| 6,540,332 B2 | 4/2003 | Silverbrook | |
| 6,666,543 B2 | 12/2003 | Silverbrook | |
| 6,824,251 B2 | 11/2004 | Silverbrook | |
| 7,055,934 B2 | 6/2006 | Silverbrook | |
| 2003/0095726 A1 | 5/2003 | Silverbrook | |
| 2004/0070648 A1 | 4/2004 | Silverbrook | |
| 2005/0128252 A1 | 6/2005 | Silverbrook | |

FOREIGN PATENT DOCUMENTS

| | | | |
|---|---|---|---|
| DE | 2905063 A | 8/1980 |
| DE | 3245283 A | 6/1984 |
| DE | 3430155 A | 2/1986 |
| DE | 3716996 A | 12/1988 |
| DE | 3934280 A | 4/1990 |
| DE | 4328433 A | 3/1995 |
| DE | 19516997 A | 11/1995 |
| DE | 19517969 A | 11/1995 |
| DE | 19532913 A | 3/1996 |
| DE | 19623620 A1 | 12/1996 |
| DE | 19639717 A | 4/1997 |
| EP | 0092229 A | 10/1983 |
| EP | 0398031 A | 11/1990 |
| EP | 0427291 A | 5/1991 |
| EP | 0431338 A | 6/1991 |
| EP | 0478956 A | 4/1992 |
| EP | 0506232 A | 9/1992 |
| EP | 0510648 A | 10/1992 |
| EP | 0627314 A | 12/1994 |
| EP | 0634273 A2 | 1/1995 |
| EP | 0713774 A2 | 5/1996 |
| EP | 0737580 A | 10/1996 |
| EP | 0750993 A | 1/1997 |
| EP | 0882590 A | 12/1998 |
| FR | 2231076 A | 12/1974 |
| GB | 792145 A | 3/1958 |
| GB | 1428239 A | 3/1976 |
| GB | 2262152 A | 6/1993 |
| JP | 58-112747 A | 7/1983 |
| JP | 58-116165 A | 7/1983 |
| JP | 61-025849 A | 2/1986 |
| JP | 61-268453 A | 11/1986 |
| JP | 01-105746 A | 4/1989 |
| JP | 01-115639 A | 5/1989 |
| JP | 01-128839 A | 5/1989 |
| JP | 01-257058 A | 10/1989 |
| JP | 01-306254 A | 12/1989 |
| JP | 02-050841 A | 2/1990 |
| JP | 02-092643 A | 4/1990 |
| JP | 02-108544 A | 4/1990 |
| JP | 02-158348 A | 6/1990 |
| JP | 02-162049 A | 6/1990 |
| JP | 02-265752 A | 10/1990 |
| JP | 03-065348 A | 3/1991 |
| JP | 03-112662 A | 5/1991 |
| JP | 03-180350 A | 8/1991 |
| JP | 04-001051 A | 1/1992 |
| JP | 04-118241 A | 4/1992 |
| JP | 04-126255 A | 4/1992 |
| JP | 04-141429 A | 5/1992 |
| JP | 04-353458 A | 12/1992 |
| JP | 04-368851 A | 12/1992 |
| JP | 05-284765 A | 10/1993 |
| JP | 05-318724 A | 12/1993 |
| JP | 06-091865 A | 4/1994 |
| JP | 06-091866 A | 4/1994 |
| JP | 07-314665 A | 12/1995 |
| WO | WO 94/18010 A | 8/1994 |
| WO | WO 97/12689 A | 4/1997 |
| WO | WO 00/55089 A | 9/2000 |

OTHER PUBLICATIONS

Noworolski J M et al: "Process for in-plane and out-of-plane single-crystal-silicon thermal microactuators" Sensors and Actuators A, Ch. Elsevier Sequoia S.A., Lausane, vol. 55, No. 1, Jul. 15, 1996, pp. 65-69, XP004077979.

Yamagata, Yutaka et al, "A Micro Mobile Mechanism Using Thermal Expansion and its Theoretical Analysis", Proceedings of the workshop on micro electro mechanical systems (MEMS), US, New York, IEEE, vol. Workshop 7, Jan. 25, 1994, pp. 142-147, XP000528408, ISBN: 0-7803-1834-X.

* cited by examiner

NOZZLE ARRANGEMENT FOR A PRINTHEAD INTEGRATED CIRCUIT INCORPORATING A LEVER MECHANISM

CROSS REFERENCE TO RELATED APPLICATIONS

The present application is a Continuation of U.S. application Ser. No. 11/764,746 filed on Jun. 18, 2007, now issued U.S. Pat. No. 7,322,679, which is a Continuation of U.S. application Ser. No. 11/442,191 filed on May 30, 2006, now issued as U.S. Pat. No. 7,252,367, which is a Continuation of U.S. application Ser. No. 11/165,183 filed Jun. 24, 2005, now issued as U.S. Pat. No. 7,055,934, which is a Continuation of U.S. application Ser. No. 11/038,201 filed Jan. 21, 2005, now issued as U.S. Pat. No. 6,976,751, which is a Continuation of U.S. application Ser. No. 10/713,093 filed on Nov. 17, 2003, now issued as U.S. Pat. No. 7,008,046, which is a continuation of U.S. application Ser. No. 10/302,275 filed on Nov. 23, 2002, now issued as U.S. Pat. No. 6,669,332, which is a continuation of U.S. application Ser. No. 10/120,347 filed Apr. 12, 2002, now issued as U.S. Pat. No. 6,540,332, which is a Continuation-In-Part of U.S. application Ser. No. 09/112,767 filed Jul. 10, 1998, now issued as U.S. Pat. No. 6,416,167, all of which are herein incorporated by reference.

STATEMENT REGARDING FEDERALLY SPONSORED RESEARCH OR DEVELOPMENT

Not Applicable

FIELD OF THE INVENTION

This invention relates to a micro-electromechanical liquid ejection device.

REFERENCED PATENT APPLICATIONS

The following patents/patent applications are incorporated by reference.

| | | | | | |
|---|---|---|---|---|---|
| 6362868 | 6227652 | 6213588 | 6213589 | 6231163 | 6247795 |
| 6394581 | 6244691 | 6257704 | 6416168 | 6220694 | 6257705 |
| 6247794 | 6234610 | 6247793 | 6264306 | 6241342 | 6247792 |
| 6264307 | 6254220 | 6234611 | 6302528 | 6283582 | 6239821 |
| 6338547 | 6247796 | 6557977 | 6390603 | 6362843 | 6293653 |
| 6312107 | 6227653 | 6234609 | 6238040 | 6188415 | 6227654 |
| 6209989 | 6247791 | 6336710 | 6217153 | 6416167 | 6243113 |
| 6283581 | 6247790 | 6260953 | 6267469 | 6273544 | 6309048 |
| 6420196 | 6443558 | 6439689 | 6378989 | 6848181 | 6634735 |
| 6623101 | 6406129 | 6505916 | 6457809 | 6550895 | 6457812 |
| 6428133 | 6485123 | 6425657 | 6488358 | 7021746 | 6712986 |
| 6981757 | 6505912 | 6439694 | 6364461 | 6378990 | 6425658 |
| 6488361 | 6814429 | 6471336 | 6457813 | 6540331 | 6454396 |
| 6464325 | 6443559 | 6435664 | 6488360 | 6550896 | 6439695 |
| 6447100 | 09/900160 | 6488359 | 6618117 | 6803989 | 7044589 |
| 6416154 | 6547364 | 6644771 | 6565181 | 6857719 | 6702417 |
| 6918654 | 6616271 | 6623108 | 6625874 | 6547368 | 6508546 |

BACKGROUND OF THE INVENTION

As set out in the above referenced applications/patents, the Applicant has spent a substantial amount of time and effort in developing printheads that incorporate micro electromechanical system (MEMS)—based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

Common to most of the printhead chips that the Applicant has developed is a component that moves with respect to a substrate to eject ink from a nozzle chamber. This component can be in the form of an ink-ejecting member that is displaceable in a nozzle chamber to eject the ink from the nozzle chamber.

A particular difficulty that the Applicant has been faced with is to achieve a suitable interface between a prime mover in the form of an actuator and the moving component. This interface is required to permit the moving component to be displaced in the nozzle chamber and to inhibit leakage of ink from the nozzle chamber.

As set out in the above referenced patents/patent applications, the printhead chip is manufactured using integrated circuit fabrication techniques. This is the usual manner in which MEMS—based devices are fabricated. Such forms of fabrication are subject to constraints since they involve successive deposition and etching techniques. It follows that MEMS—based devices are usually formed in layers and that components having relatively complex shapes are difficult and expensive to fabricate.

In FIG. 1, reference numeral 10 generally indicates part of a nozzle arrangement of a printhead chip. The part 10 shown illustrates an actuator 12 and an ink-ejecting member 14. The actuator 12 includes an elongate actuator arm 16 that extends from an anchor 18. The actuator arm 16 is configured so that, when it receives a drive signal, the actuator arm 16 bends towards a substrate 20 as indicated by an arrow 22. A connecting formation 24 is interposed between the actuator arm 16 and the ink-ejecting member 14. Thus, when the actuator arm 16 is bent towards the substrate 20, the ink-ejecting member 14 is displaced in the direction of an arrow 26 to eject ink from the nozzle chamber.

It would be intuitive simply to use the arrangement 10 together with a suitable sealing structure to achieve effective ink ejection and sealing. The reason for this is that it would appear that the actuator arm 16, the connecting formation 24 and the ink-ejecting member 14 could be in the form of a unitary structure. However, the Applicant has found that it is not possible to achieve a working configuration as shown by using MEMS—based fabrication techniques. In particular, it has been found by the Applicant that such a unitary structure does not lend itself to such fabrication techniques.

It follows that the Applicant has been led to conceive the present invention.

SUMMARY OF THE INVENTION

According to a first aspect of the invention, there is provided a micro-electromechanical liquid ejection device that comprises a substrate that incorporates drive circuitry;

nozzle chamber walls that are positioned on the substrate to define a nozzle chamber, the nozzle chamber walls including a roof wall that defines an ejection port in fluid communication with the nozzle chamber, the substrate defining an inlet passage through the substrate and into the nozzle chamber;

an elongate drive member, the drive member being fast with the substrate at a fixed end and incorporating an electrical circuit that is in electrical contact with the drive circuitry to receive an electrical signal from the drive circuitry, the drive member being configured so that a free end is displaced relative to the substrate on receipt of the electrical signal;

a motion-transmitting member that is fast with the free end of the drive member so that the motion-transmitting member is displaced together with the free end; and an elongate liquid displacement member that is fast at one end with the motion-transmitting member and extends into the nozzle chamber to be displaced together with the motion-transmitting member to eject liquid from the ejection port.

The motion-transmitting member may define a first class lever and may have an effort formation that is fast with the free end of the drive member, a load formation that is fast with the liquid displacement member and a fulcrum formation that is fast with the substrate. The effort and load formations may be pivotal with respect to the fulcrum formation.

The drive member may be a thermal bend actuator of the type that uses differential thermal expansion to achieve displacement.

The thermal bend actuator may be of a conductive material that is capable of thermal expansion and may have an active portion and a passive portion, the active portion defining the electrical circuit, in the form of a heating circuit, so that the active portion is heated and expands relative to the passive portion on receipt of the electrical signal to generate displacement of the actuator in one direction and termination of the signal results in contraction of the active portion to generate displacement of the actuator in an opposite direction.

The conductive material of the actuator may be resiliently flexible to facilitate said displacement of the actuator in the opposite direction.

The drive member, the working member and the fulcrum formation may be of the same material, while the effort formation and the load formation may be of a different material to that of the drive member and the working member.

The fulcrum formation may be configured to facilitate resilient deformation of the fulcrum formation to accommodate movement of the effort formation and the load formation.

The fulcrum formation and the load formation may define one of the nozzle chamber walls. The roof wall and the load formation may define a gap to permit relative movement of the load formation and the roof wall. The load formation and the roof wall may further define meniscus anchor points to permit liquid in the nozzle chamber to form a meniscus that spans the gap so that the meniscus can define a fluidic seal to inhibit the egress of ink from the nozzle chamber.

The invention extends to a printhead chip that comprises a plurality of liquid ejection devices as described above.

According to a second aspect of the invention, there is provided a printhead chip for an inkjet printhead, the printhead chip comprising a substrate; and a plurality of nozzle arrangements positioned on the substrate, each nozzle arrangement comprising a nozzle chamber structure that defines a nozzle chamber in which ink is received;

an ink-ejecting member that is positioned in the nozzle chamber and is displaceable in the nozzle chamber to eject ink from the nozzle chamber;

at least one actuator that is positioned on the substrate, the, or each, actuator having a working portion that is displaceable with respect to the substrate when the actuator receives a driving signal;

a sealing structure that is positioned on the substrate and is interposed between the, or each, actuator and the ink-ejecting member to inhibit a passage of ink between the ink-ejecting member and the actuator; and a motion-transmitting structure that bridges the sealing structure, the motion-transmitting structure interconnecting the working portion of the actuator and the ink-ejecting member so that displacement of the working portion relative to the substrate is transmitted to the ink-ejecting member.

The invention is now described, by way of example, with reference to the accompanying drawings. The following description is not intended to limit the broad scope of the above summary.

DETAILED DESCRIPTION OF THE INVENTION

Figure 1:
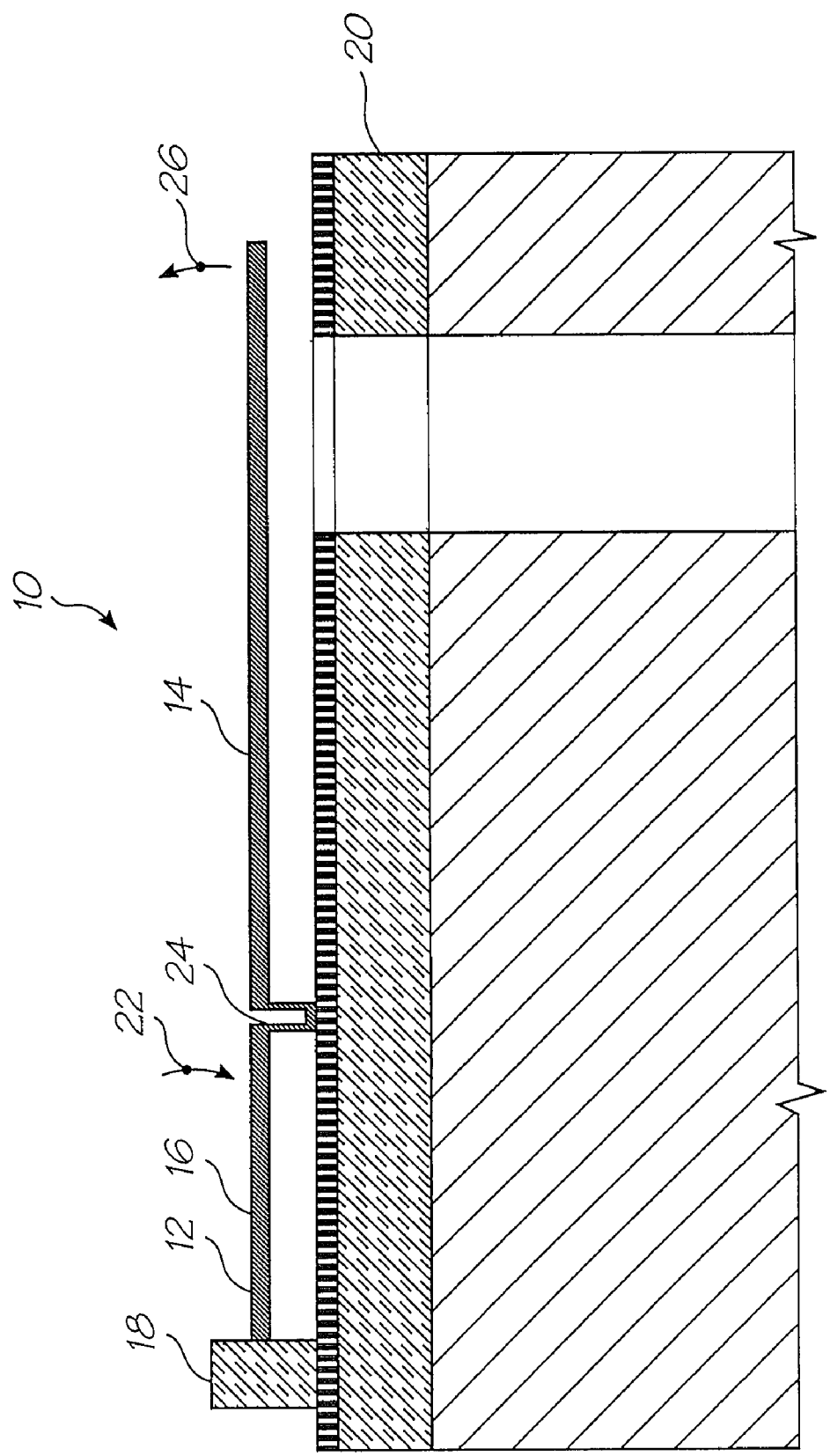
FIG. 1 shows a schematic side sectioned view of part of a nozzle arrangement of a printhead chip for an inkjet printhead for the purposes of conceptual illustration.
Figure 2:
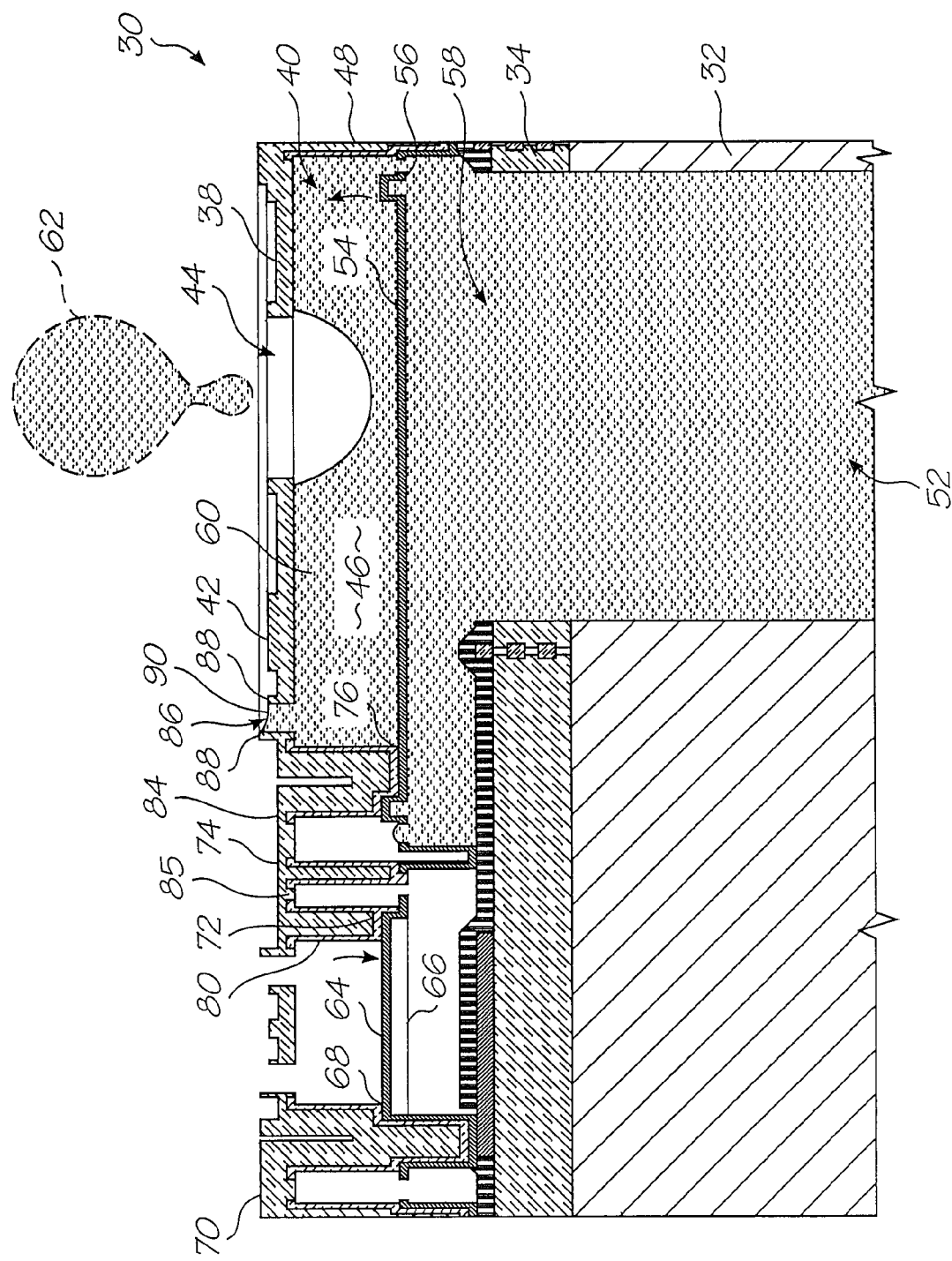
FIG. 2 shows a schematic side sectioned view of a nozzle arrangement of a first embodiment of a printhead chip, in accordance with the invention, for an inkjet printhead.

In FIG. 2, reference numeral 30 generally indicates a nozzle arrangement of a first embodiment of an ink jet printhead chip, in accordance with the invention, for an inkjet printhead.

The nozzle arrangement 30 is one of a plurality of such nozzle arrangements formed on a silicon wafer substrate 32 to define the printhead chip of the invention. As set out in the background of this specification, a single printhead can contain up to 84 000 such nozzle arrangements. For the purposes of clarity and ease of description, only one nozzle arrangement is described. It is to be appreciated that a person of ordinary skill in the field can readily obtain the printhead chip by simply replicating the nozzle arrangement 30 on the wafer substrate 32.

The printhead chip is the product of an integrated circuit fabrication technique. In particular, each nozzle arrangement 30 is the product of a MEMS—based fabrication technique. As is known, such a fabrication technique involves the deposition of functional layers and sacrificial layers of integrated circuit materials. The functional layers are etched to define various moving components and the sacrificial layers are etched away to release the components. As is known, such fabrication techniques generally involve the replication of a large number of similar components on a single wafer that is subsequently diced to separate the various components from each other. This reinforces the submission that a person of ordinary skill in the field can readily obtain the printhead chip of this invention by replicating the nozzle arrangement 30.

An electrical drive circuitry layer 34 is positioned on the silicon wafer substrate 32. The electrical drive circuitry layer 34 includes CMOS drive circuitry. The particular configuration of the CMOS drive circuitry is not important to this description and has therefore been shown schematically in the drawings. Suffice to say that it is connected to a suitable microprocessor and provides electrical current to the nozzle arrangement 30 upon receipt of an enabling signal from said suitable microprocessor. An example of a suitable microprocessor is described in the above referenced patents/patent applications. It follows that this level of detail will not be set out in this specification.

An ink passivation layer 36 is positioned on the drive circuitry layer 34. The ink passivation layer 36 can be of any suitable material, such as silicon nitride.

The nozzle arrangement 30 includes a nozzle chamber structure 38. The nozzle chamber structure 38 defines a nozzle chamber 40 and has a roof 42 that defines an ink ejection port 44.

The nozzle chamber structure 38 includes a pair of opposed sidewalls 46, a distal end wall 48 and a proximal end wall 50 so that the nozzle chamber 40 is generally rectangular in plan.

A plurality of ink inlet channels 52 are defined through the silicon wafer substrate 32, the drive circuitry layer 34 and the ink passivation layer 36. One ink inlet channel 52 is in fluid communication with each respective nozzle chamber 40. Further, each ink inlet channel 52 is aligned with each respective ink ejection port 44.

The nozzle arrangement 30 includes an ink-ejecting member in the form of a paddle 54. The paddle 54 is dimensioned to correspond generally with the nozzle chamber 40. Further, the paddle 54 has a distal end portion 56 that is interposed between an opening 58 of the ink inlet channel 52 and the ink ejection port 44. The paddle 54 is angularly displaceable within the nozzle chamber 40 so that the distal end portion 56 can move towards and away from the ink ejection port 44. Thus, when the nozzle chamber 40 is filled with ink 60, such movement of the paddle 54 results in a fluctuation of ink pressure within the nozzle chamber 40 so that an ink drop 62 is ejected from the ink ejection port 44. The mechanism of ink drop ejection is fully set out in the above referenced applications and patents. It follows that this detail is not set out in this specification.

The nozzle arrangement 30 includes an actuator in the form of a thermal bend actuator 64. This form of actuator is also described in the above referenced applications and patents and is therefore not described in further detail in this specification. Briefly, however, the thermal bend actuator 64 includes an actuator arm 66 that has a fixed end 68 that is fixed to an anchor 70 and a working end 72 that is displaceable towards and away from the substrate 32 upon receipt of a drive signal in the form of a current pulse emanating from the drive circuitry layer 34.

The nozzle arrangement 30 includes a sealing structure 78 that is interposed between the working end 72 of the actuator arm 66 and a proximal end portion 76 of the paddle 54. The actuator arm 66, the sealing structure 78 and the paddle 54 are the product of a deposition and etching process carried out with a single material. However, the arm 66, the sealing structure 78 and the paddle 54 are discrete components. This facilitates fabrication of the nozzle arrangement 30.

The material can be any of a number of materials used in integrated circuit fabrication processes. However, it is a requirement that the material have a coefficient of thermal expansion that is such that the material is capable of expansion and contraction when heated and subsequently cooled to an extent sufficient to perform work on a MEMS scale. Further, it is preferable that the material be resiliently flexible. The Applicant has found that titanium aluminum nitride (TiAlN) is particularly suited for the task.

The nozzle arrangement 30 includes a motion-transmitting structure 74 that interconnects the working end 72 of the actuator arm 66 and the proximal end portion 76 of the paddle 54. The motion-transmitting structure 74 bridges the sealing structure 78 so that the sealing structure 78 is interposed between at least a portion of the motion-transmitting structure 74 and the sealing structure 78.

The motion-transmitting structure 74 includes an effort formation 80 that extends from the working end 72 of the actuator arm 66. The motion-transmitting structure 74 also includes a load formation 82 that extends from the proximal end portion 76 of the paddle 54. A lever arm formation 84 interconnects the effort and load formations 80, 82. The lever arm formation 84 is pivotally connected between the sidewalls 46 with connectors in the form of opposed flexural connectors 85. The flexural connectors 85 are configured to experience torsional distortion upon pivotal movement of the lever arm formation 84. It will therefore be appreciated that, upon reciprocal movement of the working end 72 of the actuator arm 66, the lever arm formation 84 pivots. This pivotal movement results in the angular displacement of the paddle 54, as described above, via the load formation 82.

The motion-transmitting structure 74 and the roof 42 define a slotted opening 86 that accommodates relative movement of the structure 74 and the roof 42. The slotted opening 86 is interposed between a pair of ridges 88 that extend from the structure 74 and the roof 42. The ridges 88 are dimensioned so that, when the nozzle chamber 40 is filled with the ink 60, a fluidic seal 90 is defined between the ridges 88. Similarly, the sealing structure 78 and the proximal end portion 76 of the paddle 54 are configured so that a fluidic seal 92 is defined between the proximal end portion 76 and the sealing structure 78.

Figure 3:
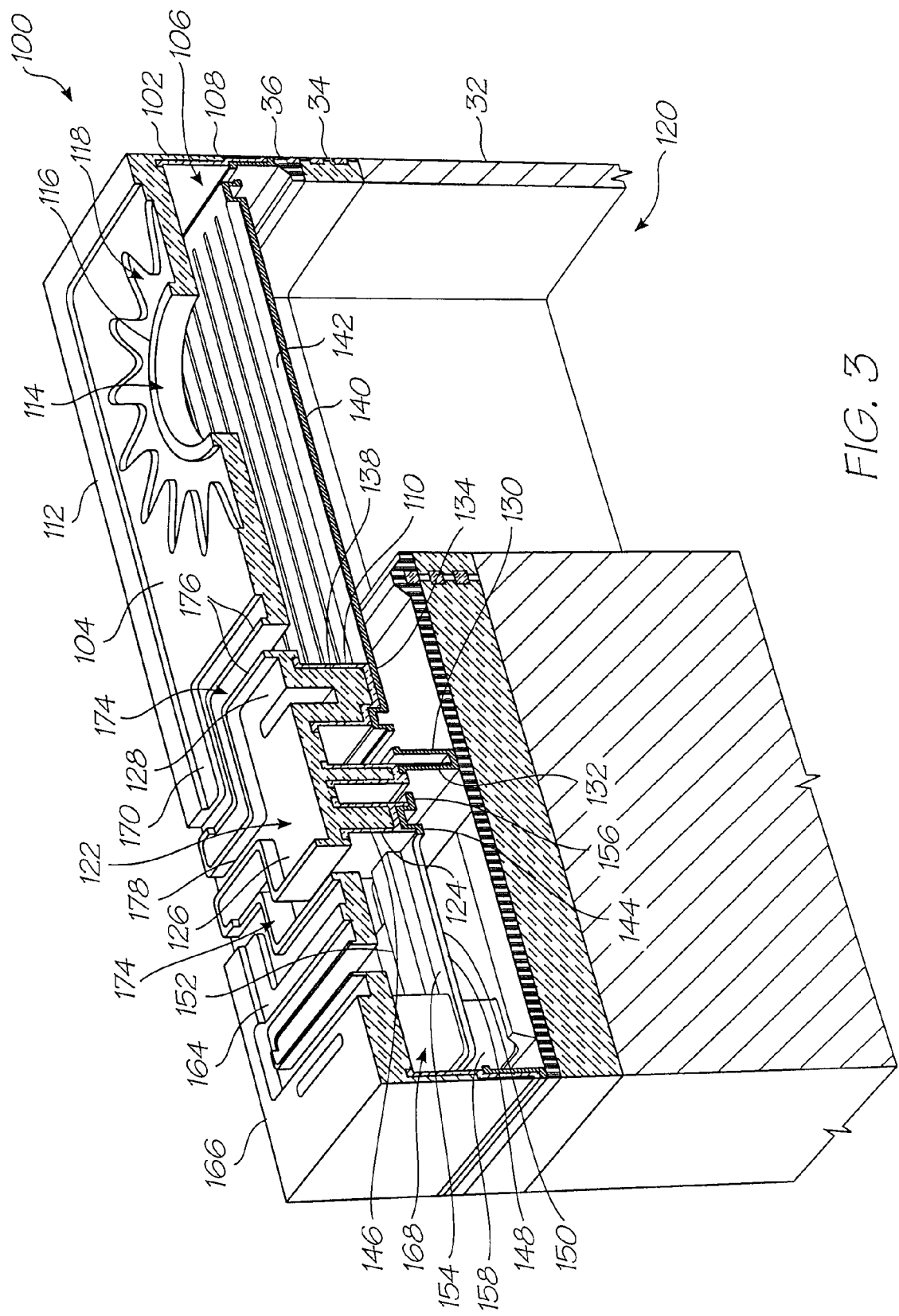
FIG. 3 shows a three dimensional, side sectioned view of a nozzle arrangement of a second embodiment of a printhead chip, in accordance with the invention, for an inkjet printhead.
Figure 4:
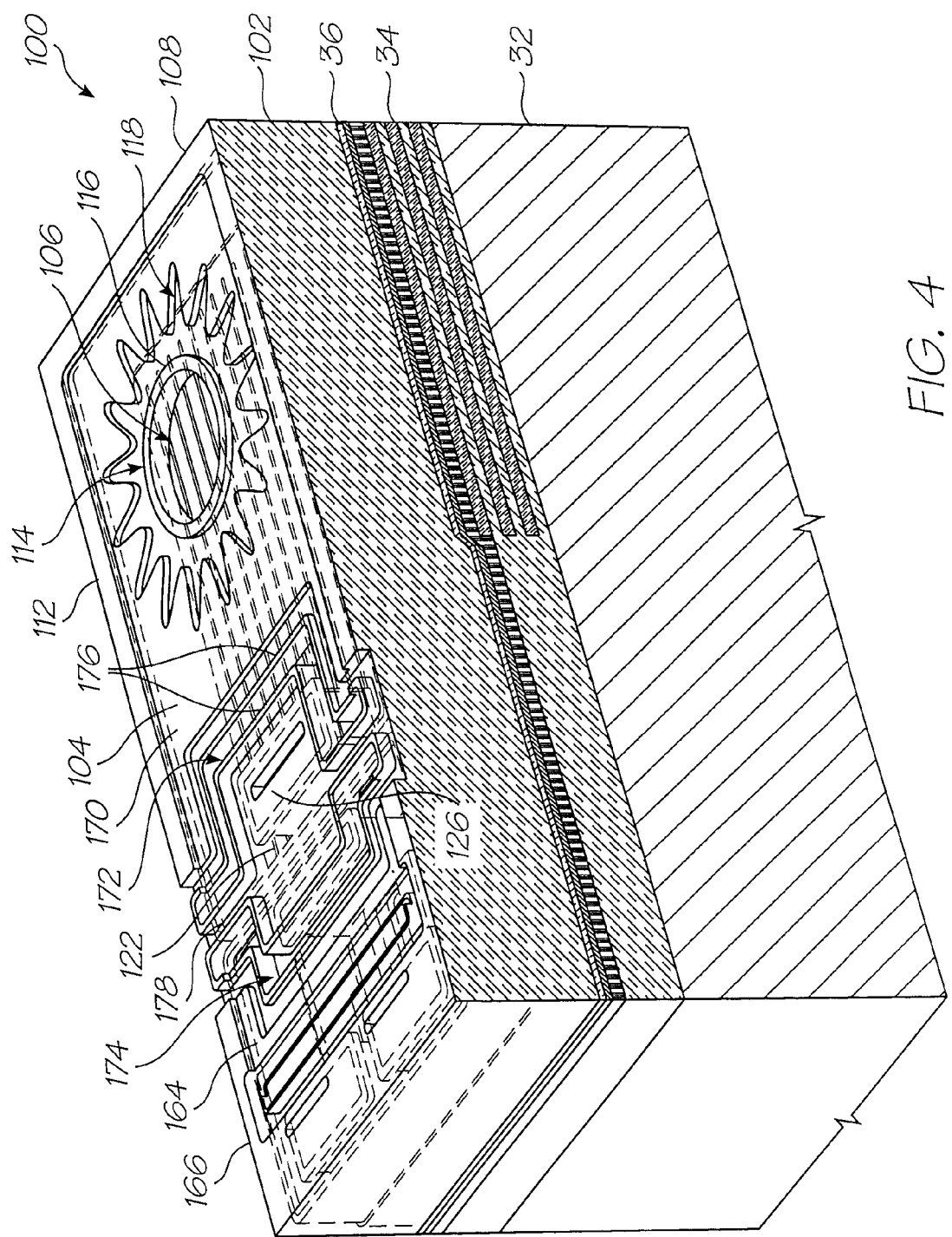
FIG. 4 shows a three dimensional view of the nozzle arrangement of FIG. 3.

In FIGS. 3 and 4, reference numeral 100 generally indicates a nozzle arrangement of an inkjet printhead chip, in accordance with the invention, for an inkjet printhead. With reference to FIG. 2, like reference numerals refer to like parts, unless otherwise specified.

The nozzle arrangement 100 includes nozzle chamber walls 102 positioned on the ink passivation layer 36. A roof 104 is positioned on the nozzle chamber walls 102 so that the roof 104 and the nozzle chamber walls 102 define a nozzle chamber 106. The nozzle chamber walls 102 include a distal end wall 108, a proximal end wall 110 and a pair of opposed sidewalls 112. An ink ejection port 114 is defined in the roof 104 to be in fluid communication with the nozzle chamber 106. The roof 104 defines a nozzle rim 116 and a recess 118 positioned about the rim 116 to inhibit ink spread.

The walls 102 and the roof 104 are configured so that the nozzle chamber 106 is rectangular in plan.

A plurality of ink inlet channels 120, one of which is shown in the drawings, are defined through the substrate 32, the drive circuitry layer 34 and the ink passivation layer 36. The ink inlet channel 120 is in fluid communication with the nozzle chamber 106 so that ink can be supplied to the nozzle chamber 106.

The nozzle arrangement 100 includes a motion-transmitting structure 122. The motion-transmitting structure 122 includes an effort formation 124, a lever arm formation 126 and a load formation 128. The lever arm formation 126 is interposed between the effort formation 124 and the load formation 128.

The nozzle arrangement 100 includes a sealing structure 130 that is fast with the ink passivation layer 36. In particular, the sealing structure 130 is composite with a primary layer 132 and a secondary layer 134. The layers 132, 134 are configured so that the sealing structure 130 is resiliently deformable to permit pivotal movement of the lever arm formation 126 with respect to the substrate 32. The layers 132, 134 can be of a number of materials that are used in integrated circuit fabrication. The Applicant has found that titanium aluminum nitride (TiAlN) is a suitable material for the layer 132 and that titanium is a suitable material for the layer 134.

The load formation 128 defines part of the proximal end wall 110. The load formation 128 is composite with a primary layer 136 and a secondary layer 138. As with the sealing structure 130, the layers 136, 138 can be of any of a number of materials that are used in integrated circuit fabrication. However, as set out above, successive deposition and etching steps are used to fabricate the nozzle arrangement 100. It follows that it is convenient for the layers 136, 138 to be of the same material as the layers 132, 134. Thus, the layers 136, 138 can be of TiAlN and titanium, respectively.

The nozzle arrangement 100 includes an ink-ejecting member in the form of an elongate rectangular paddle 140. The paddle 140 is fixed to the load formation 128 and extends towards the distal end wall 108. Further, the paddle 140 is dimensioned to correspond generally with the nozzle chamber 106. It follows that displacement of the paddle 140 towards and away from the ink ejection port 114 with sufficient energy results in the ejection of an ink drop from the ink ejection port. The manner in which drop ejection is achieved is described in detail in the above referenced patents/applications and is therefore not discussed in any detail here.

To facilitate fabrication, the paddle 140 is of TiAlN. In particular, the paddle 140 is an extension of the layer 136 of the load formation 128 of the motion-transmitting structure 122.

The paddle 140 has corrugations 142 to strengthen the paddle 140 against flexure during operation.

The effort formation 124 is also composite with a primary layer 144 and a secondary layer 146.

The layers 144, 146 can be of any of a number of materials that are used in integrated circuit fabrication. However, as set out above, successive deposition and etching steps are used to fabricate the nozzle arrangement 100. It follows that it is convenient for the layers 144, 146 to be of the same material as the layers 132, 134. Thus, the layers 144, 146 can be of TiAlN and titanium, respectively.

The nozzle arrangement 100 includes an actuator in the form of a thermal bend actuator 148. The thermal bend actuator 148 is of a conductive material that is capable of being resistively heated. The conductive material has a coefficient of thermal expansion that is such that, when heated and subsequently cooled, the material is capable of expansion and contraction to an extent sufficient to perform work on a MEMS scale.

The thermal bend actuator 148 can be any of a number of thermal bend actuators described in the above patents/patent applications. In one example, the thermal bend actuator 148 includes an actuator arm 150 that has an active portion 152 and a passive portion. The active portion 152 has a pair of inner legs 154 and the passive portion is defined by a leg positioned on each side of the pair of inner legs 154. A bridge portion 156 interconnects the active inner legs 154 and the passive legs. Each leg 154 is fixed to one of a pair of anchor formations in the form of active anchors 158 that extend from the ink passivation layer 36. Each active anchor 158 is configured so that the legs 154 are electrically connected to the drive circuitry layer 34.

Each passive leg is fixed to one of a pair of anchor formations in the form of passive anchors 160 that are electrically isolated from the drive circuitry layer 34.

Thus, the legs 154 and the bridge portion 156 are configured so that when a current from the drive circuitry layer 34 is set up in the legs 154, the actuator arm 150 is subjected to differential heating. In particular, the actuator arm 150 is shaped so that the passive legs are interposed between at least a portion of the legs 154 and the substrate 32. It will be appreciated that this causes the actuator arm 150 to bend towards the substrate 32.

The bridge portion 156 therefore defines a working end of the actuator 148. In particular, the bridge portion 156 defines the primary layer 144 of the effort formation 124. Thus, the actuator 148 is of TiAlN. The Applicant has found this material to be well suited for the actuator 148.

The lever arm formation 126 is positioned on, and fast with, the secondary layers 134, 138, 146 of the sealing structure 130, the load formation 128 and the effort formation 124, respectively. Thus, reciprocal movement of the actuator 148 towards and away from the substrate 32 is converted into reciprocal angular displacement of the paddle 140 via the motion-transmitting structure 122 to eject ink drops from the ink ejection port 114.

Each active anchor 158 and passive anchor is also composite with a primary layer 160 and a secondary layer 162. The layers 160, 162 can be of any of a number of materials that are used in integrated circuit fabrication. However, in order to facilitate fabrication, the layer 160 is of TiAlN and the layer 162 is of titanium.

A cover formation 164 is positioned on the anchors to extend over and to cover the actuator 148. Air chamber walls 166 extend between the ink passivation layer 36 and the cover formation 164 so that the cover formation 164 and the air chamber walls 166 define an air chamber 168. Thus, the actuator 148 and the anchors are positioned in the air chamber 168.

The cover formation 164, the lever arm formation 126 and the roof 104 are in the form of a unitary protective structure 170 to inhibit damage to the nozzle arrangement 100.

The protective structure 170 can be one of a number of materials that are used in integrated circuit fabrication. The Applicant has found that silicon dioxide is particularly useful for this task.

It will be appreciated that it is necessary for the lever arm formation 126 to be displaced relative to the cover formation 164 and the roof 104. It follows that the cover formation 164 and the lever arm formation 126 are demarcated by a slotted opening 172 in fluid communication with the air chamber 168. The roof 104 and the lever arm formation 126 are demarcated by a slotted opening 174 in fluid communication with the nozzle chamber 106.

The lever arm formation 126 and the roof 104 together define ridges 176 that bound the slotted opening 172. Thus, when the nozzle chamber 106 is filled with ink, the ridges 176 define a fluidic seal during ink ejection. The ridges 176 serve to inhibit ink spreading by providing suitable adhesion surfaces for a meniscus formed by the ink.

The slotted openings 172, 174 demarcate resiliently flexible connectors in the form of a pair of opposed flexural connectors 178 defined by the protective structure 170. The flexural connectors 178 are configured to experience torsional deformation in order to accommodate pivotal movement of the lever arm formation 126 during operation of the nozzle arrangement 100. The silicon dioxide of the protective structure 170 is resiliently flexible on a MEMS scale and is thus suitable for such repetitive distortion.

It should be noted that the paddle 140, the sealing structure 130 and the actuator arm 150 are discrete components. This facilitates fabrication of the nozzle arrangement 100 while still retaining the advantages of efficient motion transfer and sealing.

I claim:

1. A nozzle arrangement for a printhead integrated circuit, the arrangement having walls defining a chamber and a roof with an ink ejection port positioned on a substrate that incorporates drive circuitry, said arrangement comprising:
   a motion transmitting structure formed on the substrate and having an effort formation, a lever arm formation and a load formation, the lever arm formation interposed between the effort formation and the load formation;
   a resiliently deformable sealing structure interposed between the substrate and the lever arm formation to permit pivotal movement of the lever arm formation with respect to the substrate;
   a thermal bend actuator connected to the drive circuitry and being reciprocally displaceable with respect to the substrate on receipt of a signal from said drive circuitry, the actuator being connected to the effort formation; and
   an ink ejecting member connected to the load formation so that said reciprocal displacement of the actuator towards and away from the substrate is converted into reciprocal angular displacement of the ejecting member via the motion-transmitting structure, to eject ink in the chamber from the ink ejection port.

2. The nozzle arrangement of claim 1, wherein the chamber walls include a distal end wall, a proximal end wall and a pair of opposed sidewalls to define a rectangular chamber, the roof defining a port nozzle rim and a recess positioned about the rim to inhibit ink spread.

3. The nozzle arrangement of claim 2, wherein the ink ejecting member is fixed to the load formation and extends towards the distal end wall, said member having corrugations to strengthen the member against flexure during operation.

4. The nozzle arrangement of claim 1, wherein the thermal bend actuator includes an actuator arm having an active portion and a passive portion, the active portion including a pair of inner legs and the passive portion defined by a leg positioned on each side of the pair of inner legs, a bridge portion interconnecting the active inner legs and the passive legs, each active leg fixed to an active anchor formation extending from the substrate, said anchor formations electrically connecting the inner legs to a drive circuitry layer of the substrate.

5. The nozzle arrangement of claim 4, wherein each passive leg is fixed to a passive anchor formation electrically isolating said passive legs from the drive circuitry layer.

6. The nozzle arrangement of claim 1, wherein the lever arm formation and the roof together define ridges forming a fluidic seal during ink ejection, said ridges inhibiting ink spreading by providing suitable adhesion surfaces for a meniscus formed by the ink.

7. The nozzle arrangement of claim 1, wherein the roof and the lever arm formation are demarcated by a slotted opening in fluid communication with the chamber, the slotted opening demarcating a resiliently flexible connector in the form of a pair of opposed flexural connectors configured to experience torsional deformation in order to accommodate pivotal movement of the lever arm formation during operation of the nozzle arrangement.

* * * * *